United States Patent [19]

Wolter et al.

[11] Patent Number: 5,067,375
[45] Date of Patent: Nov. 26, 1991

[54] POWER OPERATED WIRE STRIPPER

[75] Inventors: Eric H. Wolter, Rockford; James A. Wennemar, Sycamore, both of Ill.

[73] Assignee: Ideal Industries, Inc., Sycamore, Ill.

[21] Appl. No.: 613,993

[22] Filed: Nov. 15, 1990

[51] Int. Cl.$^5$ .............................................. H02G 1/12
[52] U.S. Cl. ................................................... 81/9.42
[58] Field of Search ..................... 81/9.41, 9.42, 9.43, 81/9.4

[56] References Cited

U.S. PATENT DOCUMENTS

| | | | |
|---|---|---|---|
| 2,523,936 | 9/1950 | Axelsen | 81/9.5 |
| 2,996,939 | 8/1961 | Meier | 81/9.1 |
| 3,069,943 | 12/1962 | Fischer | 81/9.5 |
| 3,177,741 | 4/1965 | DeBruin | 81/9.5 |
| 3,515,018 | 6/1970 | Metcalf | 81/9.5 |
| 3,564,951 | 2/1971 | Metcalf | 81/9.5 |
| 3,727,492 | 4/1973 | Zanni | 81/9.43 |
| 4,072,069 | 2/1978 | Bieganski | 81/9.43 |
| 4,350,061 | 9/1982 | Isham et al. | 81/9.51 |
| 4,638,692 | 1/1987 | Bensussen | 81/9.41 |
| 4,803,903 | 2/1989 | Wolter et al. | 81/9.43 |

Primary Examiner—Roscoe V. Parker
Attorney, Agent, or Firm—Kinzer, Plyer, Dorn, McEachran & Jambor

[57] ABSTRACT

This is concerned with a power operated wire stripper and is more specifically concerned with the power adaptation or conversion of a known type of hand operated wire stripper.

3 Claims, 3 Drawing Sheets

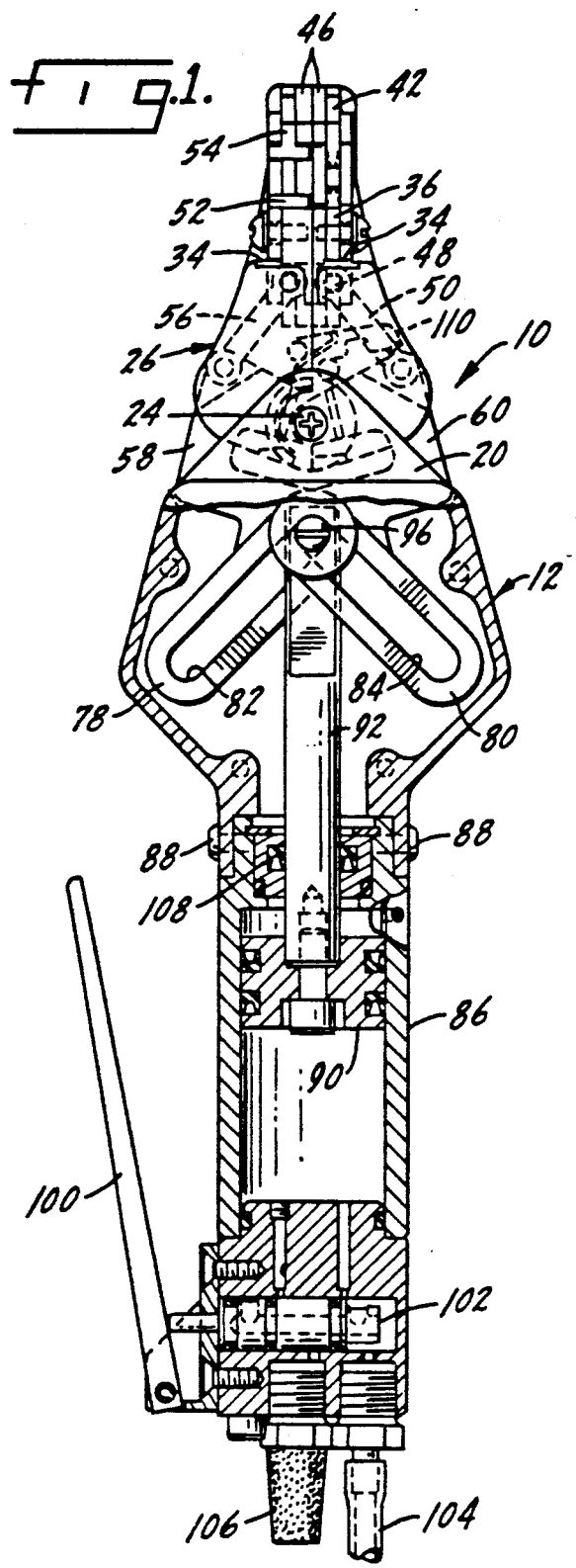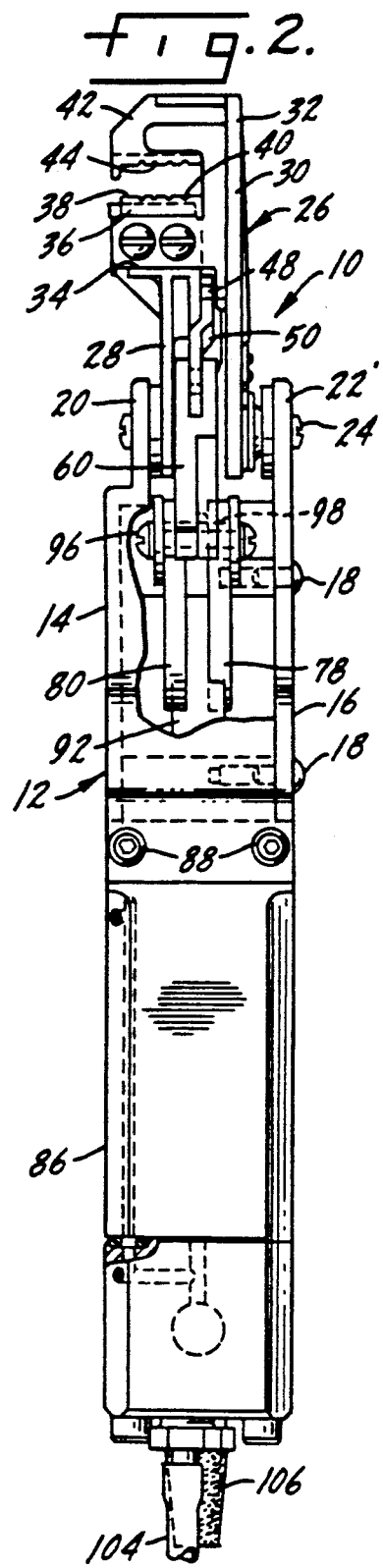

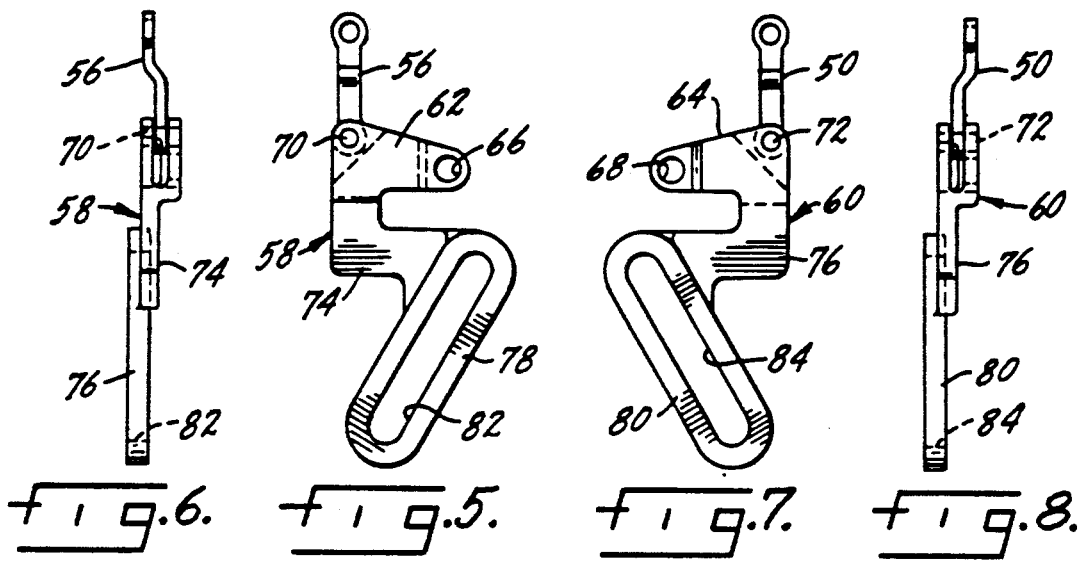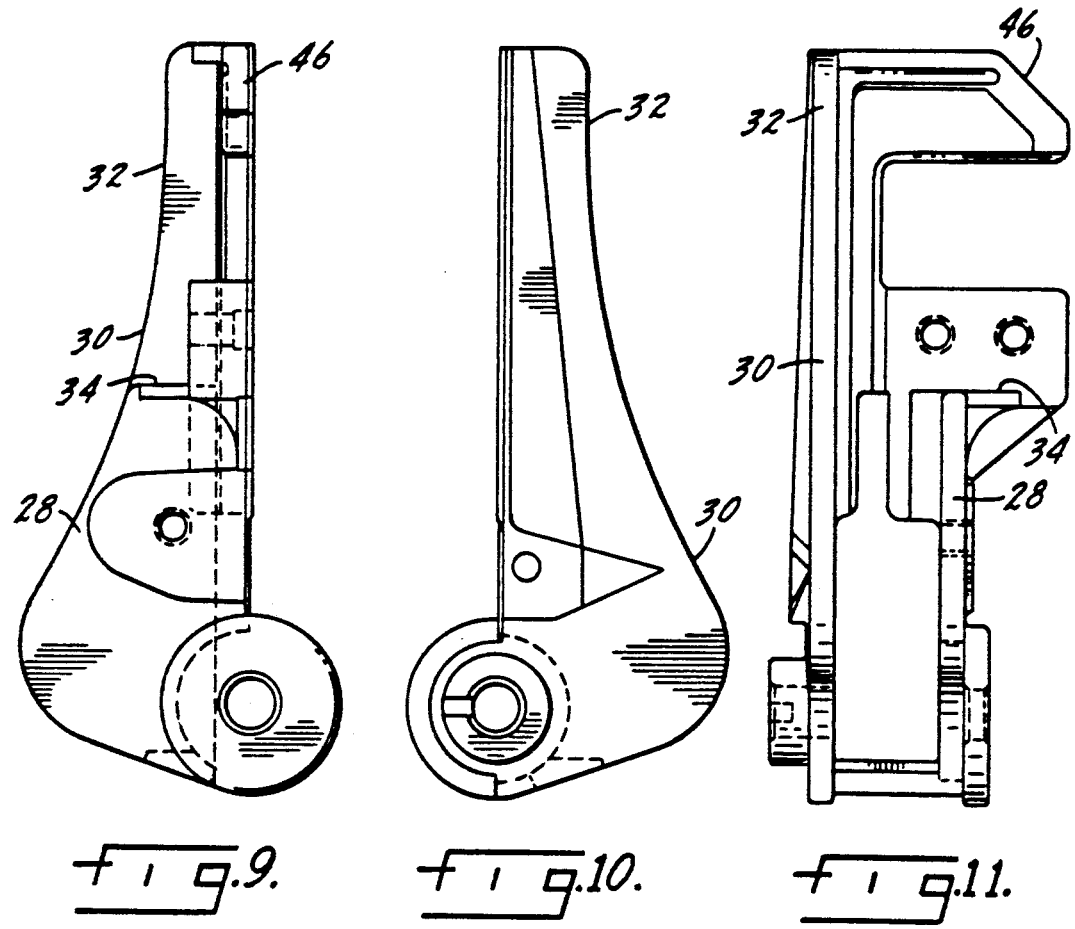

POWER OPERATED WIRE STRIPPER

SUMMARY OF THE INVENTION

This is concerned with a power operated wire stripper in which a power cylinder, shown generally as an air operated cylinder, is connected through a linkage mechanism to a pair of levers each of which have a pair of jaws thereon, one jaw pair being clamping jaws and the other being stripping jaws and the levers perform an opening and closing action under power by the air cylinder.

A primary object of the invention is a power operated stripper of the above type in which a housing with an open interior is open on both ends thereof with a stripping mechanism mounted in and projecting from one end of the housing and a power cylinder mounted on and closing the other end.

Another object is a power operated stripper in which a motion translation mechanism converts the straight line linear motion of an air cylinder into a stripping action which takes place generally at right angles to the cylinder.

Another object is a stripper mechanism which is designed to eliminate hand stress.

Another object is a stripper of the above type which guards again harm to the fingers of the user.

Another object is a lightweight power operated stripper.

Another object is a power operated stripper specifically designed to be used for repetitive stripping operations.

Another object is a power operated stripper which is designed and constructed to avoid so-called Carpal Tunnel Syndrome which results from repetitive operation in the user.

Other objects will appear from time to time in the ensuing specification and drawings.

BRIEF DESCRIPTION OF THE DRAWINGS

FIG. 1 is a front view of the stripper, partly in section and with parts broken away for clarity;

FIG. 2 is a side view of FIG. 1 with parts broken away for clarity;

FIG. 5 is a front view of a part of the linkage;

FIG. 6 is side view of FIG. 5;

FIG. 7 is a front view of another part of the linkage;

FIG. 8 is a side view of FIG. 7;

FIG. 9 is a front view of the left hand frame member;

FIG. 10 is a rear view of FIG. 9; and

FIG. 11 is a side view of FIG. 9 as viewed from the left.

DETAILED DESCRIPTION OF THE INVENTION

Figure 3:
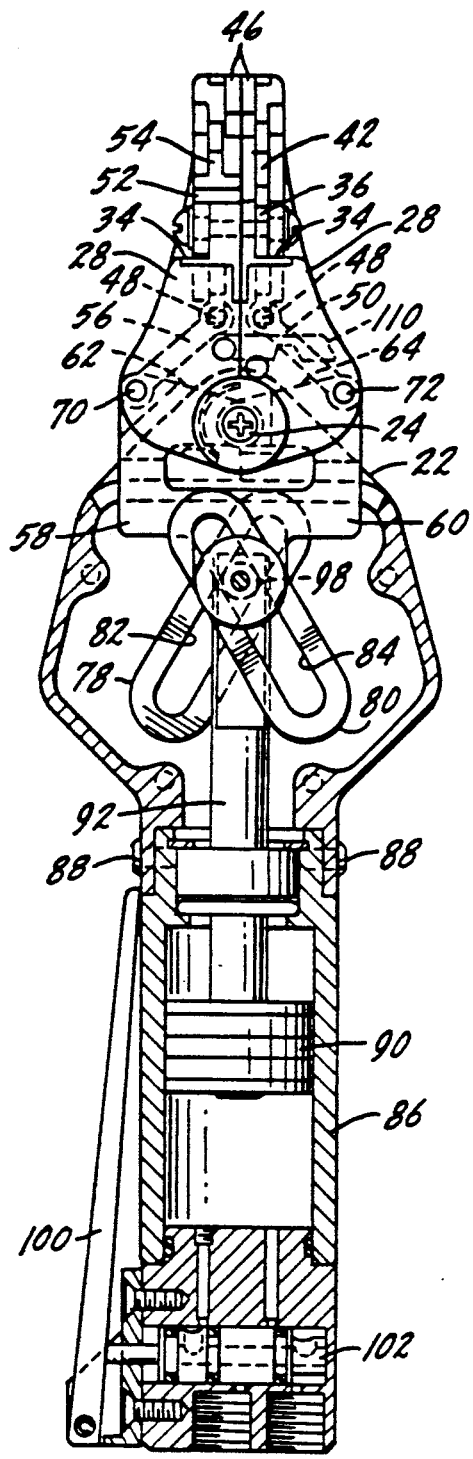
FIG. 3 is a front view, similar to FIG. 1, of an initial operative position.

In FIGS. 1 and 2 the power operated stripper is indicated generally at 10 and includes a housing 12 which is made up of a main part 14 open in the rear and closed by a cover 16 which is held in place by a suitable number of appropriately located screws 18. The top of the housing is generally open and is defined by two risers or projections, 20 on the main part of the housing and the other 22 on the back or cover. The risers provide for or support a pivot 24 which in turn serves at least partially as a mounting for a stripper mechanism indicated generally at 26.

Pivoted on pivot 24 are frame portion 28 and 30, 28 in front and 30 behind which may be considered to be levers. These frame portions or levers, as shown herein, are made of separate plate members. They may be formed otherwise and the invention is not limited to a built up frame part. The frame portions are levers 30 with upward extensions 32. Fixed between the frame portions or levers 28 and 30 at one side is a cutter support 34. This cutter support, as shown in FIG. 2, is shaped to fit between the levers 28 and 30 and to overlap lever 28 and to extend upwardly partially along the extension 32. A fixed cutter blade 36 is mounted on the support 34 and is provided with a plate-like portion 38 which is inclined, as shown in FIG. 1 and may have 1 or more notches 40 of different sizes formed therein. A movable cutter element or blade 42 has corresponding cutting notches or openings 44 and is positioned to slide, with respect to the levers and is guided in part by the cutter support 34. It is also guided by the member 46 which is fixed to the upward extension 32 of one of the levers. The moving cutter 42 is provided with a downward extension and a laterally extending member 48 which fits within an eye formed in a link 50.

The opposite lever has a fixed gripping jaw 52 and a movable gripping jaw 54 all of which may be the same as or similar to the stripping jaw structure previously described. The movable gripping jaw 54 may be moved up and down by a link 56.

Links 58 and 60, shown in FIGS. 1-4 and in detail in FIGS. 5-8, have an inner extension 62 and 64 with an opening on the inner end thereof at 66 and 68 which fit on the pivot 24. The links 50 and 56 which are connected to the bottom of the upper movable jaws are pivoted to the links 62 and 64, as at 70 and 72. The links 62 and 64 both have a downward extension 74 and 76 which join a cam portion 78 and 80 each of which has an extended cam slot 82 and 84 which, when the links are in place, i.e. brought together, overlap at their upper ends in the at rest position, as shown in FIG. 1.

A power cylinder 86 is mounted on the bottom opening of the housing by suitable screws 88. The power cylinder includes a suitable piston 90 with a suitable piston rod 92 extending upwardly in the housing with cam portions 78 and 80 on each side extending upwardly therefrom and a bolt 96 at the upper end thereof extending between them and passing through the cam slots 82 and 84 of the links. The bolt or connection 96 may have a roller 98 between the cam portions 78 and 80 which will function as a cam roller.

The air cylinder is provided with an operating lever 00 which operates a valve 102 which controls the air being supplied from a suitable connection 104 and exhausted through an exhaust muffler 106. The operation of the handle, valve and air supply may be the same as that shown and described in U.S. Pat. 4,803,903, issued Feb. 14, 1989 and will not be repeated herein. The same is true of the seal or packing 108 at the upper end of the housing through which the piston rod 92 extends.

The use, operation and function of the invention are as follows:

The invention takes on the character of a housing which is open at one end and a stripping mechanism is mounted therein and extends therefrom with a power cylinder at the other end.

Figure 4:
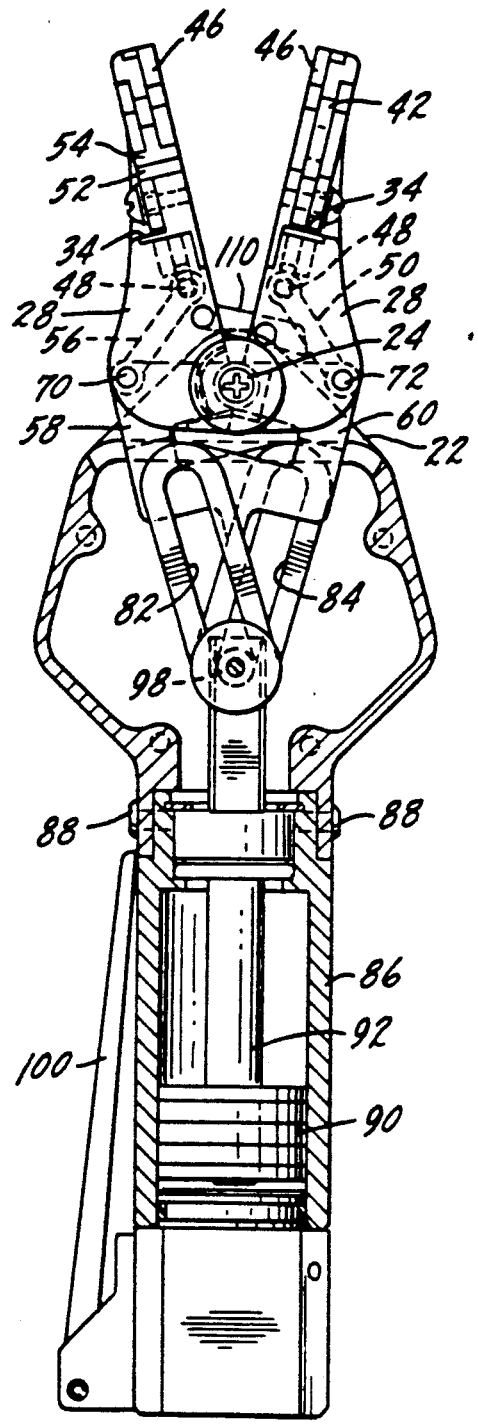
FIG. 4 is like FIG. 2 but of a further operative position.

When the power cylinder is operated so that air is supplied above the piston, the piston rod is drawn down, in FIG. 1. Initial movement of the piston rod is illustrated in FIG. 3 which pivots the links 62 and 64 somewhat to draw the upper stripping and gripping jaws down so that a wire that has been positioned between the jaws when they are in their relaxed state in FIG. 1, will be cut and gripped. Further movement of the piston and piston rod will bring the cam roller to or toward the bottom of the cam slots 82 and 84 in the links, as shown in FIG. 4, which pivots the levers apart, as shown in FIG. 4, which will cause the cut piece of insulation to be forced, pulled or separated from the wire itself.

As shown in the drawings and explained herein, the lower jaws are stationary and the upper jaws move up and down, for example as shown in U.S. Pat. No. 3,564,951, issued Feb. 23, 1971 and U.S. Pat. No. 3,515,018, issued June 2, 1970. Or both pair of jaws might move, the upper ones down and the lower ones up so that they close simultaneously at a center point such as shown in U.S. Pat. No. 3,177,741, issued Apr. 13, 1965. Whereas the particular arrangement shown with the upper jaws moving up and down relative to fixed lower jaws, the pair of jaws being mounted on levers which are pivoted and the stripping action taking place by the levers being separated apart, as shown in FIG. 4, may be the same as the unit shown in U.S. Pat. No. 2,523,936, issued Sept. 26, 1950, and this is preferred.

A latch 110 has been shown between the levers and is of the type shown in U.S. Pat. No. 2,523,936 but it might be otherwise. For example it might be of the type shown in U.S. Pat. No. 3,821,908, issued July 2, 1974. While a single latch has been shown here of the type shown in U.S. Pat. No. 2,523,936, a double latch might be used such as in U.S. Pat. No. 2,889,728, issued June 9, 1959. It might also be of the type shown in U.S. Pat. No. 2,842,992, issued July 15, 1958.

The particular shape and character of the stripping and gripping blades are of the type shown in U.S. Pat. No. 2,523,936, issued Sept. 26, 1950, but they might be of any suitable shape and size and constructed and designed for any specific purpose.

The power mechanism which is an air cylinder operates the links by moving the cam roller down the cam slots of each link so that initial movement closes the stripping and gripping jaws and further movement pivots the levers apart. When the operator releases the operating handle 100, air supplied below the piston drives it back up. The latch 110 holds the levers open while the paired jaws open and thereafter the levers close as described in U.S. Pat. No. 2,523,936. While the power source here has been described as compressed air, it should be understood that it might be otherwise. But compressed air is conventional and much easier to work with in the environment and location where tools of this type ar used.

Whereas the preferred form and several variations of the invention have been shown, described, and suggested, it should be understood that suitable additional modifications, changes, substitutions and alterations may be made without departing from the invention's fundamental theme. It is therefore wished that the invention be unrestricted except as by the appended claims.

The embodiments of the invention in which an exclusive property or privilege is claimed are defined as follows:

1. A power operated stripper for removing insulation from the ends of electric wires, comprising:
   a housing;
   a power cylinder connected to one end of the housing, a piston in the power cylinder, and a piston rod connected to the piston and extending therefrom in a defined direction into the housing;
   first and second levers pivotally mounted on a common pivot on the other end of the housing, extending in the defined direction away from the housing and arranged to perform a pivoted opening and closing action relative to each other in a direction generally at right angles to the defined direction;
   a pair of clamping jaws on one lever and a pair of stripping jaws on the other constructed to open and close on an insulated wire placed between them;
   first and second links each having an opening for pivotally mounting the links on said common pivot, the first and second links also each having a downward extension which joins a cam portion, the cam portions defining cam slots which extend at oppositely-directed angles to the defined direction, the links being mounted one on top of the other so that the cam slots overlap one another;
   third and fourth links pivotally connecting the first and second links to the first and second levers; and
   a cam roller connected to the piston rod and disposed in both cam slots such that linear translation of the piston causes pivoting of the first and second links about the common pivot, thereby causing the third and fourth links to open and close the jaws and to open and close the levers upon operation of the power cylinder.

2. The structure of claim 1 wherein the piston rod is disposed between the first and second links.

3. The structure of claim 1 wherein the cam portions are disposed within the housing.

* * * * *